United States Patent
Hoskinson (10) Patent No.: US 10,932,438 B2
(45) Date of Patent: Mar. 2, 2021

(54) ERGONOMIC PET CARRIER FOR SINGLE-PERSON USE

(71) Applicant: Paul Hoskinson, Carbondale, CO (US)

(72) Inventor: Paul Hoskinson, Carbondale, CO (US)

( * ) Notice: Subject to any disclaimer, the term of this patent is extended or adjusted under 35 U.S.C. 154(b) by 319 days.

(21) Appl. No.: 16/104,847

(22) Filed: Aug. 17, 2018

(65) Prior Publication Data
US 2019/0053461 A1 Feb. 21, 2019

Related U.S. Application Data

(60) Provisional application No. 62/546,668, filed on Aug. 17, 2017.

(51) Int. Cl.
*A01K 1/02* (2006.01)
*A01K 1/06* (2006.01)

(52) U.S. Cl.
CPC ............ *A01K 1/029* (2013.01); *A01K 1/0263* (2013.01); *A01K 1/0613* (2013.01)

(58) Field of Classification Search
CPC .... A01K 1/029; A01K 1/0613; A01K 1/0236; A01K 1/0254; A01K 1/0263; A01K 15/04; A45F 3/04
USPC .......................... 119/496, 497, 725, 726, 728
See application file for complete search history.

(56) References Cited

U.S. PATENT DOCUMENTS

| | | | | |
|---|---|---|---|---|
| 136,059 A | * | 2/1873 | Hohorst | B66C 1/127 |
| | | | | 294/77 |
| 3,535,718 A | * | 10/1970 | Murcott | A61F 5/3761 |
| | | | | 128/878 |
| 3,535,719 A | * | 10/1970 | Murcott | A61F 5/3776 |
| | | | | 5/424 |
| 4,414,969 A | * | 11/1983 | Heyman | A61F 5/3761 |
| | | | | 128/878 |
| 4,831,967 A | | 5/1989 | Anderson | |
| 5,193,486 A | | 3/1993 | Kitchens | |

(Continued)

FOREIGN PATENT DOCUMENTS

| | | | | |
|---|---|---|---|---|
| DE | 202011102300 U1 | * | 11/2011 | ........... A01K 1/0263 |
| DE | 202011107584 U1 | * | 12/2011 | ........... A01K 1/0254 |
| FR | 2906445 A3 | * | 4/2008 | ........... A01K 1/0263 |

OTHER PUBLICATIONS

RNR Dog Lift Harness, Rock N Rescue, https://www.rocknrescue.com/product/mr-dog-harness/.

*Primary Examiner* — Lisa L Tsang
(74) *Attorney, Agent, or Firm* — Snell & Wilmer L.L.P.; Russell T. Manning (57) ABSTRACT

The ergonomic pet carrier is an apparatus that evenly distributes the weight of a dog against the shoulder and the back of a user. The apparatus includes a first shoulder strap assembly, a second shoulder strap assembly, a frame, a supporting panel, and a plurality of leg-receiving holes. The first shoulder strap and the second shoulder strap assembly evenly distribute the weight of the dog across each shoulder and the back of the user. The first shoulder strap assembly and the second shoulder strap assembly restrain the dog against the back of the user as the dog rests on the supporting panel. The frame reinforces the structural integrity of the supporting panel with the first shoulder strap assembly and the second shoulder strap assembly. The plurality of leg-receiving holes allows the legs of a pet to traverse through the supporting panel and comfortably rest on the supporting panel.

12 Claims, 6 Drawing Sheets

(56) References Cited

U.S. PATENT DOCUMENTS

| | | | |
|---|---|---|---|
| D360,492 S * | 7/1995 | Horn | D3/229 |
| 5,531,187 A * | 7/1996 | Ward | B62J 7/06 |
| | | | 119/856 |
| 5,644,902 A | 7/1997 | Kemp | |
| 5,738,043 A * | 4/1998 | Manuel | A01K 27/002 |
| | | | 119/497 |
| 5,823,146 A * | 10/1998 | Alaniz | A01K 15/00 |
| | | | 119/725 |
| 6,123,049 A * | 9/2000 | Slater | A01K 27/002 |
| | | | 119/850 |
| 6,286,461 B1 | 9/2001 | Martz | |
| 6,595,162 B1 * | 7/2003 | Hibbert | A01K 1/0263 |
| | | | 119/850 |
| 6,607,107 B2 * | 8/2003 | Dexheimer | A45F 3/04 |
| | | | 224/262 |
| 6,802,282 B2 | 10/2004 | Muckleroy | |
| 7,353,779 B2 | 4/2008 | Altieri | |
| 8,474,412 B1 | 7/2013 | Walden et al. | |
| 9,320,260 B2 * | 4/2016 | Zimmerman | A01K 27/003 |
| 9,339,012 B2 * | 5/2016 | McClain | A01K 15/04 |
| 9,681,758 B2 | 6/2017 | Lau | |
| 2003/0127060 A1 * | 7/2003 | Yeung | A01K 1/0254 |
| | | | 119/497 |
| 2005/0005875 A1 * | 1/2005 | Suggs | A01K 13/001 |
| | | | 119/728 |
| 2005/0076853 A1 * | 4/2005 | Leo | A01K 1/0254 |
| | | | 119/497 |
| 2005/0238261 A1 * | 10/2005 | Godshaw | A01K 1/0254 |
| | | | 383/40 |
| 2005/0263102 A1 | 12/2005 | Sherman | |
| 2006/0049227 A1 * | 3/2006 | Godshaw | A45F 3/04 |
| | | | 224/637 |
| 2008/0072838 A1 | 3/2008 | Beach | |
| 2011/0127309 A1 * | 6/2011 | Chua | A01K 1/029 |
| | | | 224/600 |
| 2016/0174528 A1 * | 6/2016 | Dyson | A01K 15/04 |
| | | | 119/725 |
| 2017/0325424 A1 * | 11/2017 | Juarez | A01K 15/04 |
| 2018/0139921 A1 * | 5/2018 | Kath | A01K 27/003 |
| 2018/0192613 A1 | 7/2018 | Keith | |
| 2019/0014887 A1 * | 1/2019 | Soltez | A45F 3/04 |

\* cited by examiner

# ERGONOMIC PET CARRIER FOR SINGLE-PERSON USE

The current application claims priority to U.S. provisional application Ser. No. 62/546,668 filed on Aug. 17, 2017.

FIELD OF THE INVENTION

The present invention generally relates to pet carriers. More specifically, the present invention is an ergonomic pet carrier for single-person use that allows a pet to be securely carried along the back of a user.

BACKGROUND OF THE INVENTION

Existing dog rescue devices for medium to larger sized dogs include stretchers or gurney-style carrying devices that require multiple individuals to carry and cannot be used by an individual person. Dog rescue devices that can be carried by an individual may be easily stored, however, are limited to small dogs. Dog rescue devices, however, are needed in wilderness and backcountry, which are environments typically meant for medium to larger sized dogs.

There have been many publicized instances of dogs being injured as a result of hiking with their owners on mountain peaks, damaged paws on the terrain, and so on. If the dog is not able to or unwilling to walk, the owner must struggle to carry and transport the dog to safety. If the owner cannot physically carry the injured dog with his or her arms, the owner must empty his or her backpack or carrier in order to ease the transport of the injured dog to safety. Because chances are higher for dogs to get injured in the wilderness and the backcountry, cellphone service may not be as reliable and the owner cannot easily access help. In most cases, the owner must abandon the pet and find help because the backpack or carrier is too small to safely contain the injured pet. Abandoning the pet to find help leaves the injured pet at further risk for more injury or death.

It is therefore an objective of the present invention to securely, safely, and comfortably transport medium-sized and large sized dogs. The present invention is compact and easily stored throughout hiking. The present invention relieves the stress of a load being suspended against the shoulders and the back of the user.

DETAIL DESCRIPTIONS OF THE INVENTION

All illustrations of the drawings are for the purpose of describing selected versions of the present invention and are not intended to limit the scope of the present invention.

The present invention is an ergonomic pet carrier that allows a user to carry a pet with minimal effort and stress. The present invention evenly distributes the weight of a pet across the back of the user. Furthermore, the present invention comfortably suspends a pet on the back of a user, preventing the pet from becoming further injured throughout transportation with the present invention. In order for the present invention to securely contain and suspend a pet while evenly distributing weight across the back of the user, the present invention comprises a first shoulder strap assembly 1, a second shoulder strap assembly 2, a frame 13, a supporting panel 18, and a plurality of leg-receiving holes 24, seen in FIG. 1. The first shoulder strap assembly 1 and the second shoulder strap assembly 2 secure the supporting panel 18 to the user. More specifically, the first shoulder strap assembly 1 and the second shoulder strap assembly 2 suspend the supporting panel 18 and a pet along the shoulders of the user and distributes the weight of the supporting panel 18 and the pet across the back of the user. The frame 13 securely connects the first shoulder strap assembly 1 and the second shoulder strap assembly 2 to the supporting panel 18. The frame 13 reinforces the structural integrity of the supporting panel 18 and accommodates the force of the weight of the pet against the first shoulder strap assembly 1 and the second shoulder strap assembly 2. The supporting panel 18 uplifts the pet and contains the pet within the present invention. The plurality of leg-receiving holes 24 allows the legs of the pet to traverse through the supporting panel 18 so that the legs are not uncomfortably cramped within the supporting panel 18 and suspend freely beneath the supporting panel 18.

Figure 1:
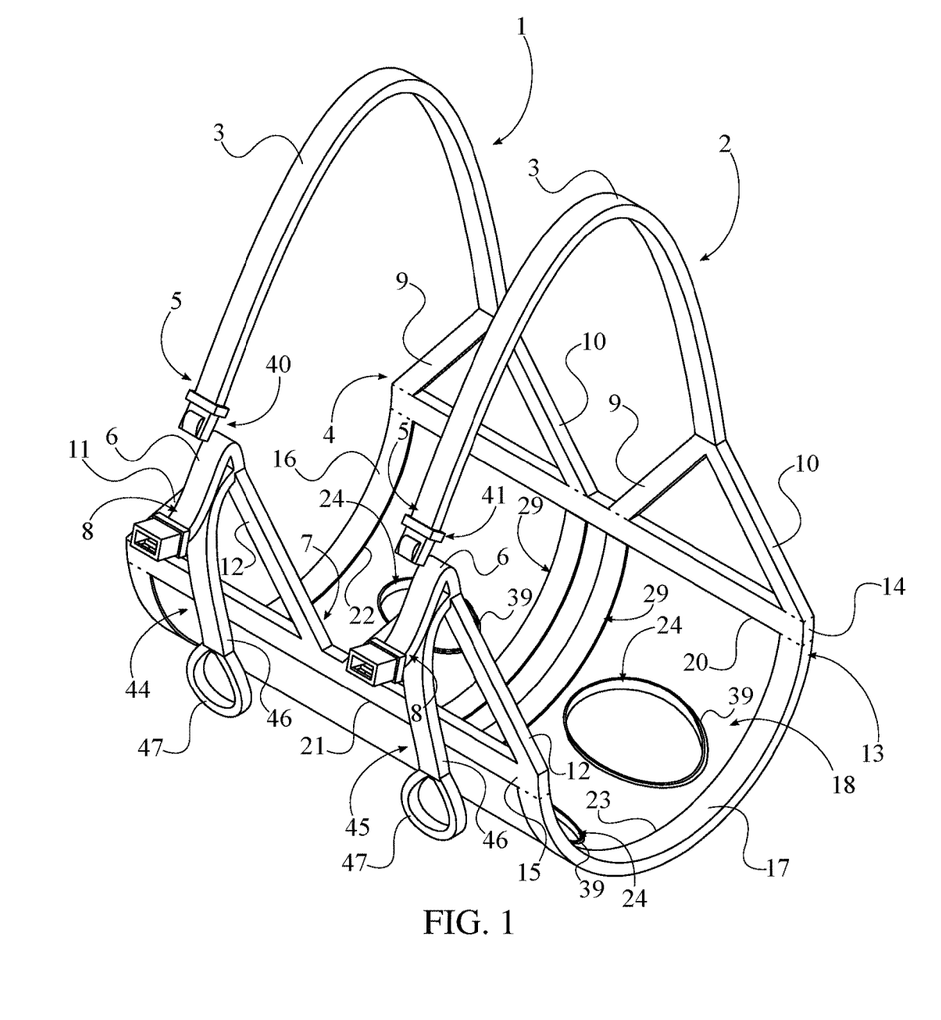
FIG. 1 is a rear perspective view of the present invention.
Figure 3:
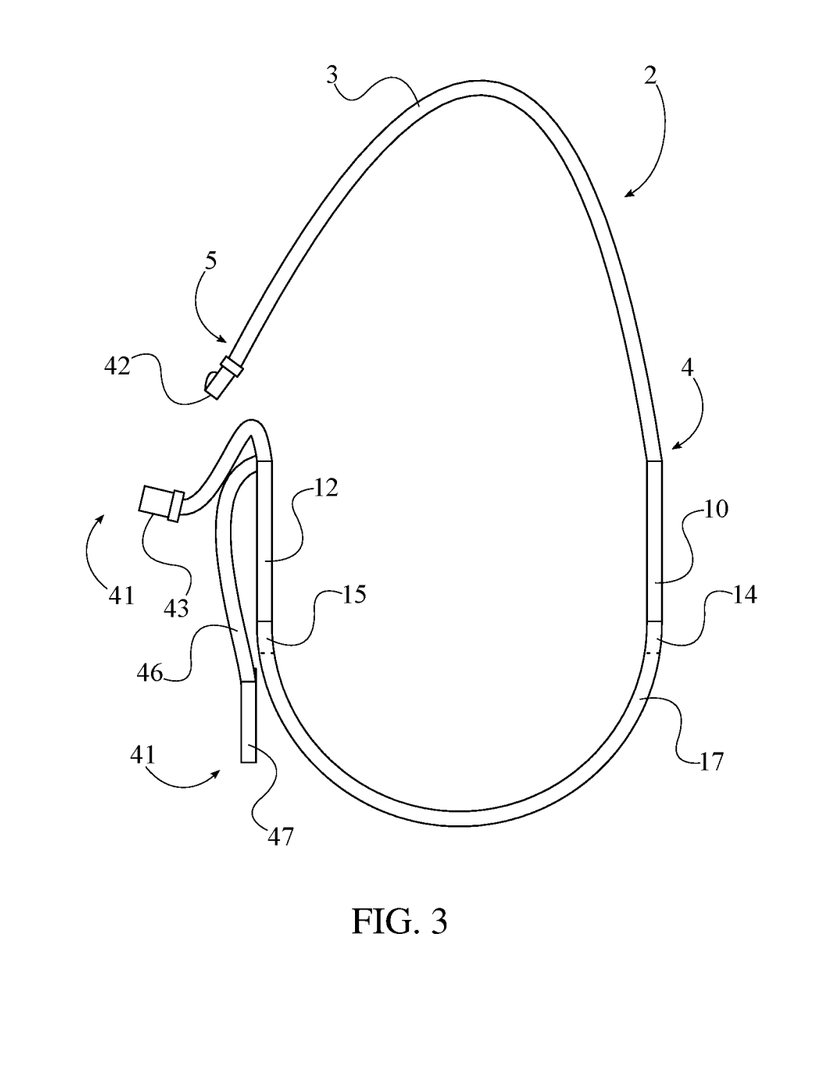
FIG. 3 is a side view of the present invention.
Figure 4:
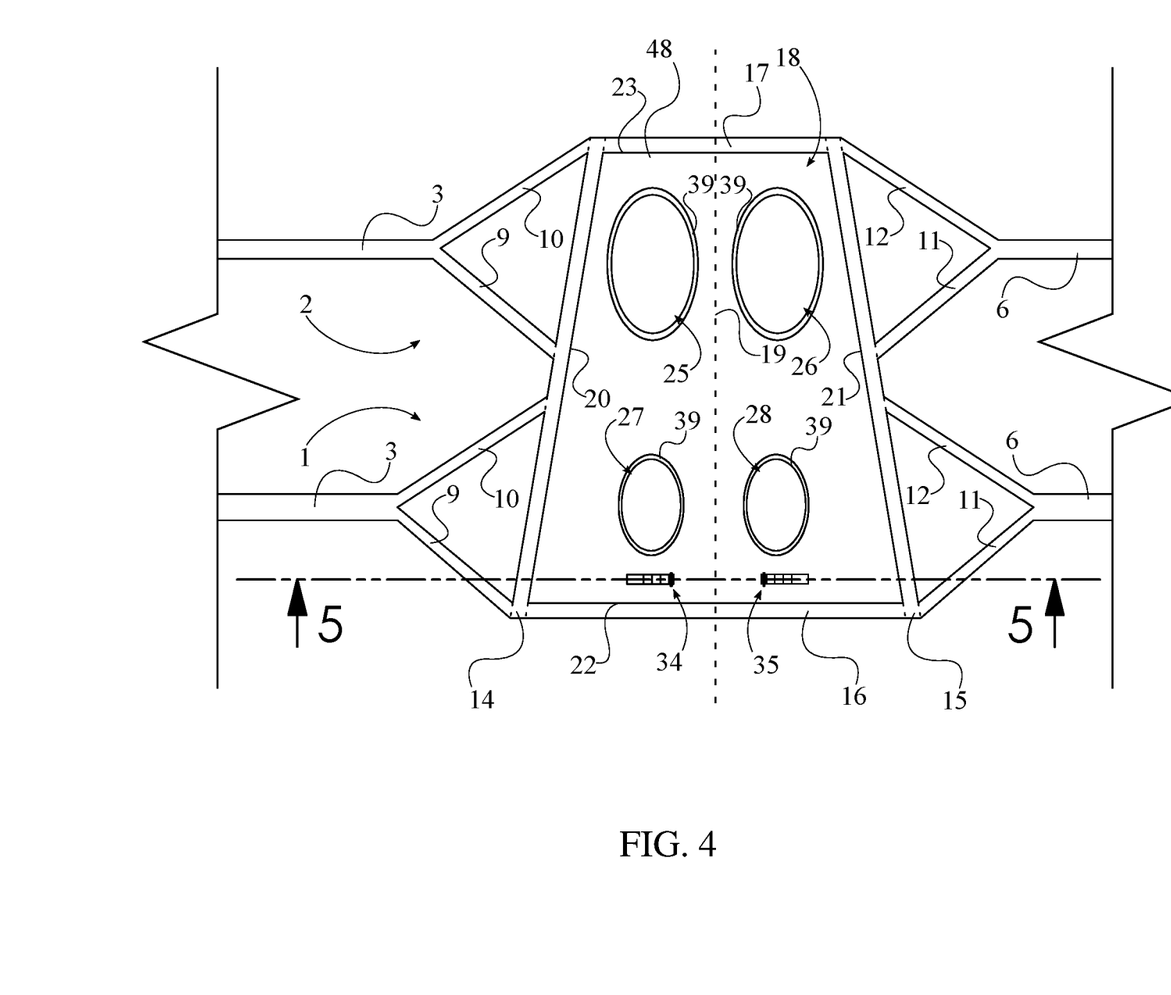
FIG. 4 is a bottom side view of the present invention in a flat configuration.
Figure 6:
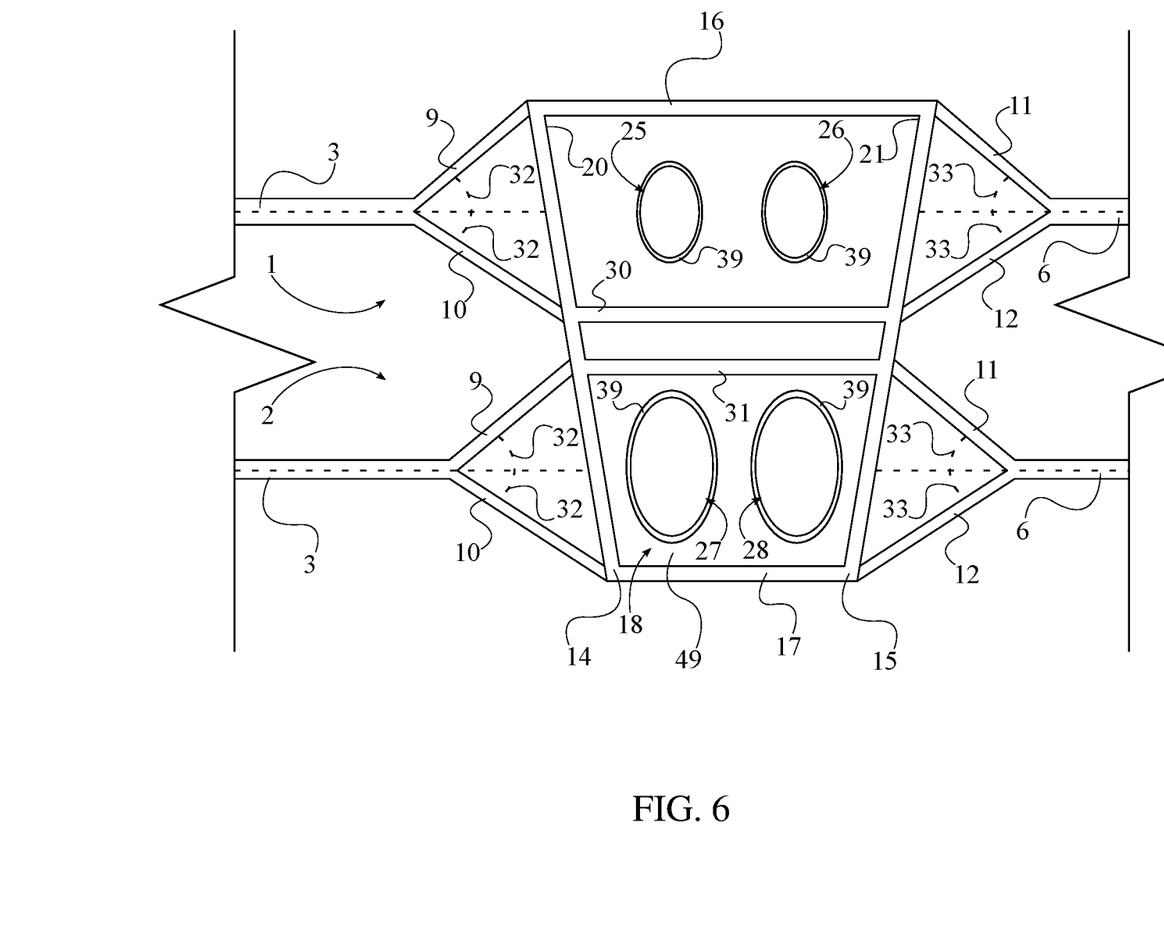
FIG. 6 is a top side view of the present invention in the flat configuration.

In order for the first shoulder strap assembly 1 and the second shoulder strap assembly 2 to securely uphold the supporting panel 18 and a pet while evenly distributing the weight of the supporting panel 18 and the pet across the back of the user, the first should strap assembly and the second shoulder strap assembly 2 each comprise a first main strap 3, a second main strap 6, a first supportive strap 9, a second supportive strap 10, a third supportive strap 11, and a fourth supportive strap 12. As seen in FIG. 1 and FIG. 3, the first main strap 3 and the second main strap 6, together, loop around a shoulder of the user. Moreover, the first main strap 3 rests on the shoulder of the user and the second main strap 6 connects the supporting panel 18 to the first main strap 3 in order for supporting panel 18 to hang solely from the first shoulder strap assembly 1 and the second shoulder strap assembly 2. The first main strap 3 and the second main strap 6 allows the present invention to be hands-free. The first main strap 3 also encloses the pet contained suspending from the supporting panel 18 against the back of the user. The first supportive strap 9 and the second supportive strap 10 connect the first main strap 3 to the frame 13. Similarly, the third supportive strap 11 and the fourth supportive strap 12 connect the second main strap 6 to the frame 13. As both the first shoulder strap assembly 1 and the second shoulder strap assembly 2 comprise a first supportive strap 9, a second supportive strap 10, a third supportive strap 11, and a fourth supportive strap 12, the supporting panel 18 is suspended from eight points of contact, evenly distributing the weight of the supporting panel 18 and the pet as well as lessening the stress on the shoulders and the back of the user. These multiple points of contact are seen in FIG. 4 and FIG. 6. Alternate embodiments of the present invention may comprise additional supportive straps in order to accommodate heavier pets.

The overall arrangement of the aforementioned components allows the present invention to safely suspend a pet from the back of the user. In order for the supporting panel 18 to effectively uphold and support a pet, the frame 13 is perimetrically fixed to the supporting panel 18, seen in FIG. 1, FIG. 4, and FIG. 6. The weight of the supporting panel 18 and the pet is evenly distributed across the back as the first shoulder strap assembly 1 is positioned adjacent the second shoulder strap assembly 2 along the frame 13. This arrangement positions the first shoulder strap assembly 1 along one shoulder of the user and the second shoulder strap assembly 2 along the opposite shoulder of the user. The force of the weight of the supporting panel 18 and the pet suspended within the supporting panel 18 is evenly distributed across the supporting panel 18 as a fixed end 4 of the first main 3 strap is connected to a first lateral strap 14 of the frame 13 with the first supportive strap 9 and the second supportive strap 10. Similarly, a fixed end 7 of the second main strap 6 is connected to a second lateral strap 15 of the frame 13 with the third supportive strap 11 and the fourth supportive strap 12. The first supportive strap 9 and the second supportive strap 10 defines two points of connection between the first main strap 3 to the frame 13. Similarly, the third supportive strap 11 and the fourth supportive strap 12 defines two points of connection between the second main strap 6 to the frame 13. In order to enclose the pet with the first main strap 3 and the back of the user, the first lateral strap 14 is positioned opposite the second lateral strap 15 across the supporting panel 18. This arrangement allows the first main strap 3 to rest on the shoulder of the user and the second main strap 6 to be positioned underneath the corresponding shoulder of the user. This arrangement also allows the first shoulder strap assembly 1 and the second strap assembly to loop around each shoulder, respectively. In order to define a loop around each shoulder, a free end 5 of the first main strap 3 is removably attached to a free end 8 of the second main strap 6. Consequently, the present invention is easily separated from the user. In order to accommodate the natural body structure of the pet as well as the user, the plurality of leg-receiving holes 24 is distributed across the supporting panel 18 and traverses through the supporting panel 18.

In order to reduce the stress of the weight of the supporting panel 18 and a pet suspended within the supporting panel 18, the first shoulder strap assembly 1 is oriented parallel with the second shoulder strap assembly 2, as seen in FIG. 4 and FIG. 6. Moreover, the first main strap 3 is oriented perpendicular to a sagittal plane 19 of the supporting panel 18, seen in FIG. 4.

The present invention further comprises at least one supplementary strap 29 as to reinforce a portion of the supporting panel 18 that supports the abdomen of the pet, shown in FIG. 6. The at least one supplementary strap 29 not only reinforces the structural integrity of the supporting panel 18, but comforts the pet suspending from the supporting panel 18 as most of the weight of the pet is centered along the abdomen of the pet. In order for the at least one supplementary strap 29 to support the center of the supplementary panel, the first supportive strap 9 is positioned opposite the second supportive strap 10 about the first main strap 3, and the first supportive strap 9 and the second supportive strap 10 are each oriented at an acute angle 32 with the first main strap 3. Similarly, the third supportive strap 11 is positioned opposite the fourth supportive strap 12 about the second main strap 6, and the third supportive strap 11 and the fourth supportive strap 12 are each oriented at an acute angle 33 with the second main strap 6. This arrangement is seen in FIG. 6. Moreover, the first supportive strap 9 is positioned opposite the third supportive strap 11 across the frame 13, and the second supportive strap 10 is positioned opposite the fourth supportive strap 12 across the frame 13. The weight of the pet on the supporting panel 18 is further distributed across supporting panel 18 as the at least one supplementary strap 29 is fixed to the supporting panel 18 and traverses from the first lateral strap 14 of the frame 13 to the second lateral strap 15 of the frame 13. This arrangement further aids in the uplifting of the pet within the supporting panel 18.

In the preferred embodiment of the present invention, the at least one supplementary strap 29 comprises a first supplementary strap 30 and a second supplementary strap 31 in order to reinforce tension between both the first shoulder strap assembly 1 and the second shoulder strap assembly 2 with the supporting panel 18. As seen in FIG. 6, the first supplementary strap 30 is positioned in between the second supportive strap 10 of the first shoulder strap assembly 1 and the fourth supportive strap 12 of the first shoulder strap assembly 1. Similarly, the second supplementary strap 31 is positioned in between the first supportive strap 9 of the second shoulder assembly and the third supportive strap 11 of the second shoulder strap assembly 2. Moreover, the first supplementary strap 30 is oriented parallel and positioned adjacent the second supplementary strap 31 across the supporting panel 18. This arrangement reinforces the connection of the first main strap 3 and the second main strap 6 with the supporting panel 18 with the frame 13.

In order for the frame 13 to structurally reinforce the supporting panel 18 and effectively connect the first shoulder strap assembly 1 and the second strap assembly with the supporting panel 18, the frame 13 comprises a front strap 16, a rear strap 17, a first lateral strap 14, and a second lateral strap 15. As seen in FIG. 1, FIG. 4, and FIG. 6, the first lateral strap 14 is fixed across a first lateral edge 20 of the supporting panel 18. Similarly, the second lateral strap 15 is fixed across a second lateral edge 21 of the supporting panel 18. The first lateral edge 20 is positioned opposite the second lateral edge 21 across the supporting panel 18. The front strap 16 is fixed in between the first lateral strap 14 and the second lateral strap 15 along a third edge of the supporting panel 18. Similarly, the rear strap 17 is positioned in between the first lateral strap 14 and the second lateral strap 15 along a fourth edge of the supporting panel 18. The third lateral edge 22 is positioned opposite the fourth lateral edge 23 across the supporting panel 18. Moreover, the front strap 16 and the rear strap 17 are connected to both the first lateral strap 14 and the second lateral strap 15.

The preferred embodiment of the present invention further accommodates the natural shape of a pet as the supporting panel 18 contours to the shape of the pet. In order to effectively account and support the distribution of weight of the pet across the supporting panel 18, a third lateral edge 22 of the supporting panel 18 and a fourth lateral edge 23 of the supporting panel 18 are positioned in between a first lateral edge 20 of the supporting panel 18 and a second lateral edge 21 of the supporting panel 18. The first lateral edge 20 is positioned opposite the second lateral edge 21 across the supporting panel 18. Similarly, the fourth lateral edge 23 is positioned opposite the third lateral edge 22 across the supporting panel 18. As seen in FIG. 4 and FIG. 6, the supporting panel 18 tapers from the third lateral edge 22 to the fourth lateral edge 23 in order to accommodate for more of the weight and width of the body of the pet along the chest and forelegs of the pet.

A pet is comfortably suspended within the supporting panel 18 as the plurality of leg-receiving holes 24 comprises a first foreleg hole 25, a second foreleg hole 26, a first hindleg hole 27, and a second hindleg hole 28, seen in FIG. 4 and FIG. 6. The first foreleg hole 25 and the second foreleg hole 26 allow the forelegs of the pet to traverse through the supporting panel 18. The first hindleg hole 27 and the second hindleg hole 28 allows the hindlegs of the pet to traverse through the supporting panel 18 as well. In the preferred embodiment of the present invention, the first foreleg hole 25 and the second foreleg hole 26 mirror each other in size and are smaller than the first hindleg hole 27 and the second hindleg hole 28. Similarly, the first hindleg hole 27 and the second hindleg hole 28 mirror each other in size. In order to comfortably position the forelegs of the pet along the supporting panel 18 such that the forelegs naturally and freely hang from the supporting panel 18, the first foreleg hole 25 is positioned offset the third lateral edge 22 of the supporting panel 18, adjacent the first lateral strap 14. Similarly, the second foreleg hole 26 is positioned offset the third lateral edge 22 of the supporting panel 18, adjacent the second lateral strap 15. In order to comfortably position the hindlegs of the pet along the supporting panel 18 such that the hindlegs naturally and freely hang from the supporting panel 18, the first hindleg hole 27 is positioned offset the fourth lateral edge 23 of the supporting panel 18, adjacent the first lateral strap 14. Similarly, the second foreleg hole 26 is positioned offset the fourth lateral edge 23 of the supporting panel 18, adjacent the second lateral strap 15.

Figure 5:
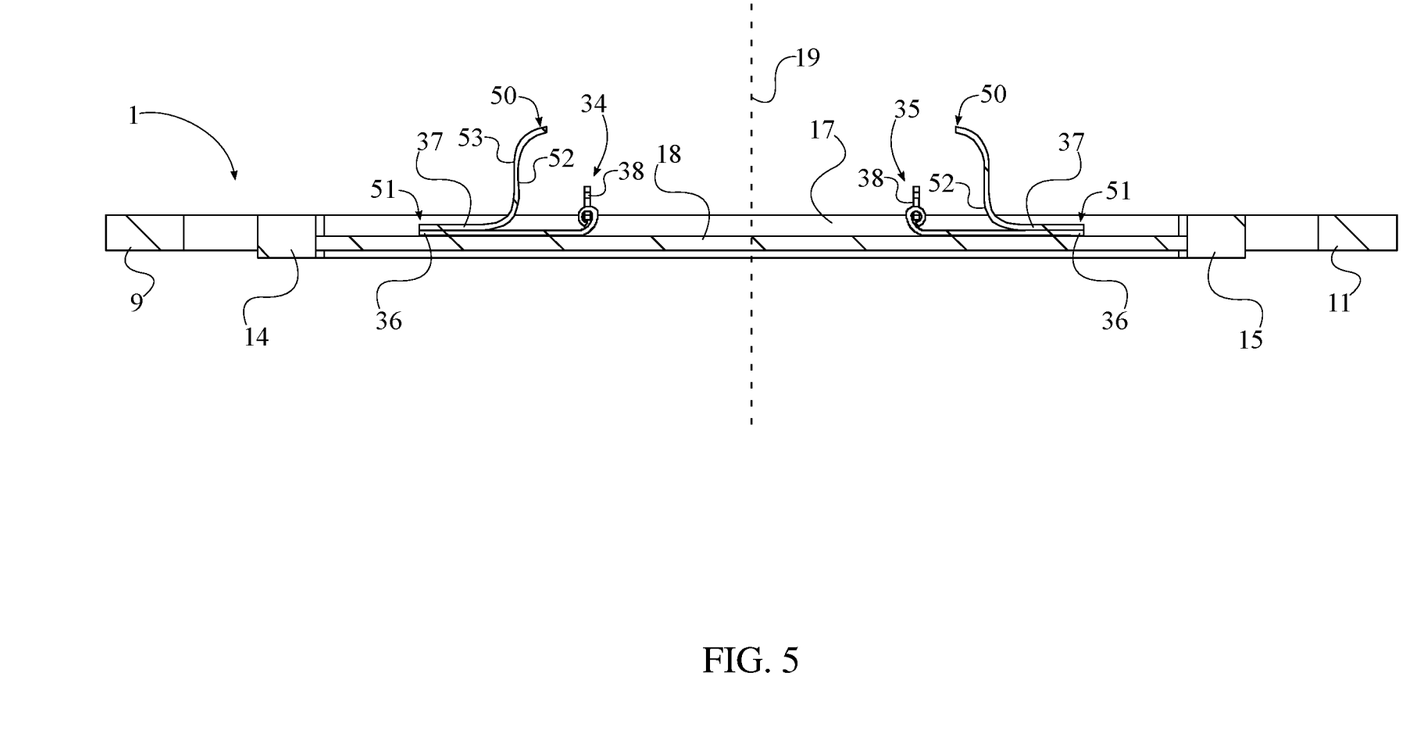
FIG. 5 is a cross-sectional view of FIG. 4 along line 5-5 of the present invention.

In order to better contain a pet within the present invention, an alternate embodiment of the present further comprises a first leg restraint 34 and a second leg restraint 35, seen in FIG. 4 and FIG. 5. The first leg restraint 34 and the second leg restraint 35 secure the forelegs of the pet against the supporting panel 18 such that the forelegs of the pet are tucked underneath the chest of the pet. Whether the forelegs of the pet need to remain stationary because of an injury or the pet needs to be further restrained with the first leg restraint 34 and the second leg restraint 35 in order to calm the pet down throughout transportation, the first leg restraint 34 and the second leg restraint 35 individually secures the forelegs of the pet against the supporting panel 18. The first leg restraint 34 and the second leg restraint 35 are fixed to a first surface 48 of the supporting panel 18. A second surface 49 of the supporting panel 18 is positioned opposite the first surface 48 about the supporting panel 18. The pet rests on the second surface 49 of the supporting panel 18, and the legs of the pet press against the first surface 48 of the supporting panel 18. The first leg restraint 34 and the second leg restraint 35 accommodate the natural bend of the forelegs of the pet as the first leg restraint 34 is positioned opposite a sagittal plane 19 of the supporting panel 18, and the first leg restraint 34 and the second leg restraint 35 are positioned along the third lateral edge 22.

In the preferred embodiment of the present invention, the first leg restraint 34 and the second leg restraint 35 each comprise a fastening strap 36, a looping strap 37, and a ring 38, seen in FIG. 5. The fastening strap 36 secures the ring 38 to the supporting panel 18. The looping strap 37 is adjustable in length and securable to the fastening strap 36 with the ring 38. The fastening strap 36 is positioned in between the supporting panel 18 and the looping strap 37 so that a loop may be defined with the fastening strap 36, the looping strap 37, and the ring 38. The ring 38 is terminally tethered to the fastening strap 36, positioned opposite the sagittal plane 19 of the supporting panel 18, comfortably positioning the corresponding foreleg of the pet against the supporting panel 18. A free end 50 of the looping strap 37 is positioned opposite a fixed end 51 along the looping strap 37, and the free end 50 of the looping strap 37 is positioned adjacent the ring 38. This arrangement allows the loop defined by the fastening strap 36, the looping strap 37, and the ring 38 to be adjustable. A first surface 52 of the looping strap 37 is positioned adjacent the fastening strap 36. The first surface 52 of the looping strap 37 is preferably smooth as the first surface 52 comes into contact with the corresponding foreleg of the pet. A second surface 53 of the looping strap 37 is positioned opposite the first surface 52 of the about the looping strap 37. The second surface 53 is preferably velcro. The second surface 53 of the free end 50 is removably attached to the second surface 53 of the fixed end 51 such that the looping strap 37 defines the size of the loop.

The comfort of a pet is further enhanced, and the structural integrity of the supporting panel 18 is reinforced around the plurality of leg-receiving holes 24 as the present invention further comprises a plurality of reinforcing frames 39, shown in FIG. 1, FIG. 4, and FIG. 6. The plurality of reinforcing frames 39 preferably comprises the same durable material as that of the frame 13, the first shoulder strap assembly 1, and the second shoulder strap assembly 2. Each reinforcing frame 13 is perimetrically positioned around a corresponding leg-receiving hole of the plurality of leg-receiving holes 24. Each leg of the pet that traverses through the plurality of leg-receiving holes 24 is cushioned against the supporting panel 18. Furthermore, supporting panel 18 is strengthened against the stress of the weight of the pet against each of the plurality of leg-receiving holes 24.

Figure 2:
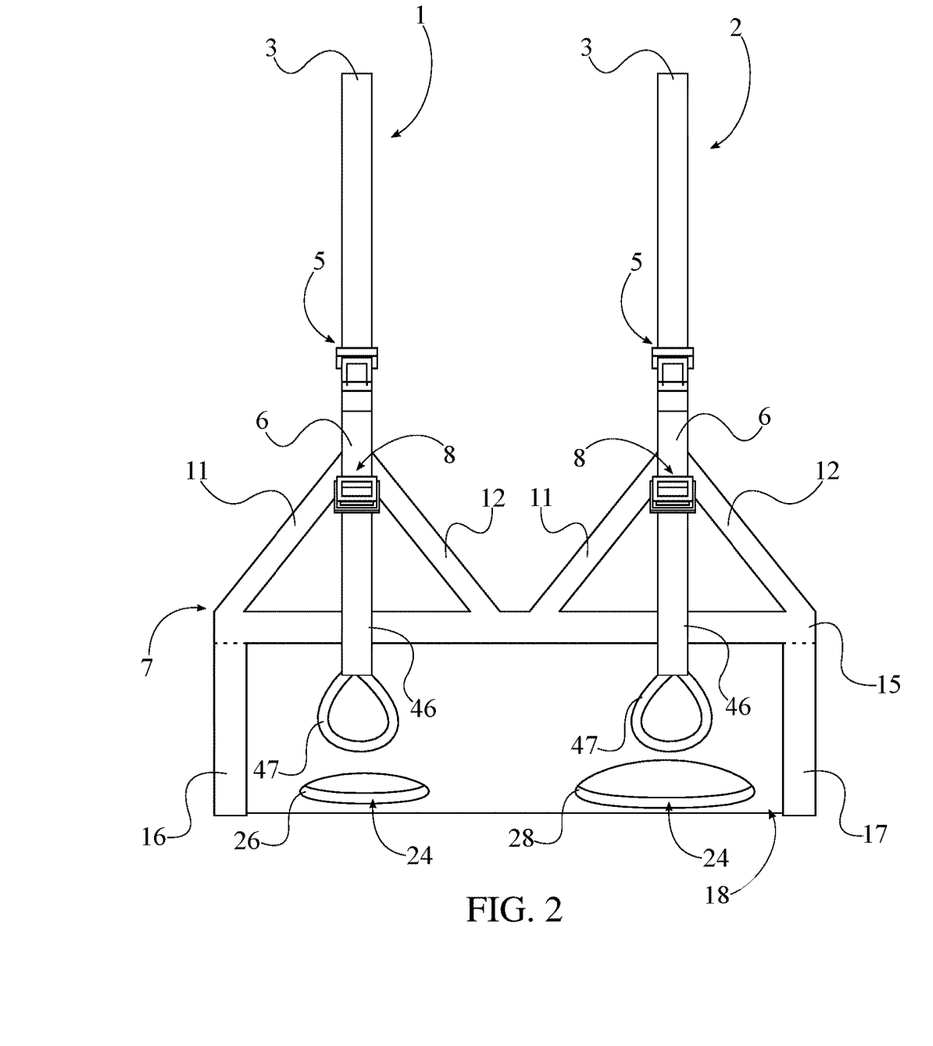
FIG. 2 is a front side view of the present invention.

In order for the first main strap 3 and the second main strap 6 of the first shoulder strap assembly 1 and the second shoulder strap assembly 2 to be removably attached to each other, the present invention comprises a first fastener 40 and a second fastener 41, seen in FIG. 1, FIG. 2, and FIG. 3. The first fastener 40 and the second fastener 41 each comprise a first member 42 and a second member 43. The first fastener 40 is connected with the first shoulder strap assembly 1, and the second fastener 41 is connected with the second shoulder strap assembly 2. The first main strap 3 and the second main strap 6 of the first shoulder strap assembly 1 is therefore able to engage with each other independently of the first main strap 3 and the second main strap 6 of the second shoulder strap assembly 2. Moreover, the first member 42 is connected to the free end 5 of the first main strap 3, and the second member 43 is connected to the free end 5 of the second main strap 6. Therefore, the first shoulder strap assembly 1 and the second shoulder strap assembly 2 are easily removeable and attachable to the user with the first fastener 40 and the second fastener 41.

The present invention allows a user to stabilize the weight of the supporting panel 18 and a pet contained within the supporting panel 18 as the present invention further comprises a first hand-loop strap 44, seen in FIG. 1, FIG. 2, and FIG. 3. The first hand-loop strap 44 allows a user to pull weight of the supporting panel 18 and the pet along the first shoulder strap assembly 1. Moreover, the first hand-loop strap 44 is connected to the first shoulder strap assembly 1. The first hand-loop comprises a connecting strap 46 and a looped strap 47. The connecting strap 46 allows the looped strap 47 to hang freely. Moreover, the connecting strap 46 positions the looped strap 47 adjacent the hands of the user while hanging. The looped strap 47 allows the user to effectively grasp the first hand-loop strap 44 and adjust the distribution of weight across the shoulder and back of the user. The looped strap 47 is connected to the second main strap 6 with the connecting strap 46 so that the looped strap 47 may freely move while remaining connected to the second main strap 6. The ergonomic structure of the present invention is preserved as the connecting strap 46 is positioned along the second main strap 6, opposite the free end 8 of the second main strap 6, thereby positioning the looped strap 47 adjacent the hand of the user.

The user effectively adjusts distribution of weight against the both shoulders and the back as the present invention further comprises a second hand-loop strap 45, also seen in FIG. 1, FIG. 2, and FIG. 3. The second hand-loop strap 45 allows a user to pull weight of the supporting panel 18 and the pet along the second shoulder strap assembly 2. Moreover, the second hand-loop strap 45 is connected to the second shoulder strap assembly 2. Similar to the first hand-loop strap 44, the second hand-loop comprises a connecting strap 46 and a looped strap 47. The connecting strap 46 allows the looped strap 47 to hang freely. Moreover, the connecting strap 46 positions the looped strap 47 adjacent the hands of the user while hanging. The looped strap 47 allows the user to effectively grasp the second hand-loop strap 45 and adjust the distribution of weight across the shoulder and back of the user. The looped strap 47 is connected to the second main strap 6 with the connecting strap 46 so that the looped strap 47 may freely move while remaining connected to the second main strap 6. The ergonomic structure of the present invention is preserved as the connecting strap 46 is positioned along the second main strap 6, opposite the free end 8 of the second main strap 6, thereby positioning the looped strap 47 adjacent the hand of the user.

Although the invention has been explained in relation to its preferred embodiment, it is to be understood that many other possible modifications and variations can be made without departing from the spirit and scope of the invention as hereinafter claimed.

What is claimed is:

1. An ergonomic pet carrier for single-person use comprises:
    a supporting panel having a plurality of leg-receiving holes distributed across and traversing through the supporting panel, the supporting panel having a first lateral edge and a second lateral edge;
    a first shoulder strap assembly and a second shoulder strap assembly, wherein the first shoulder strap assembly and the second shoulder strap assembly each comprise:
        a first main strap having a fixed end connected to the first lateral edge of the supporting panel by a first supportive strap and a second supportive strap,
        a second main strap, having a fixed end connected to the second lateral edge of the supporting panel by a third supportive strap, and a fourth supportive strap, wherein a free end of the first main strap is removably attachable to a free end of the second main strap;
    the first shoulder strap assembly being positioned adjacent the second shoulder strap assembly along the supporting panel;
    wherein the supportive straps of the first main strap of the first shoulder strap assembly and the supportive straps of the first main strap of the second shoulder strap assembly form four points of connection to the first lateral edge of the supporting the panel, and the supportive straps of the second main strap of the first shoulder strap assembly and the supportive straps of the second main strap of the second shoulder strap assembly form four points of connection to the second lateral edge of the supporting panel; and
    four supplementary straps being fixed to the supporting panel, each supplementary strap extending between and from one of the four points of connection to the first lateral edge of the supporting panel to an opposite corresponding one of the four points of connection to the second lateral edge of the supporting panel.

2. The ergonomic pet carrier for single-person use as claimed as claim 1 comprises:
    the first shoulder strap assembly being oriented parallel to the second shoulder strap assembly; and
    the first main strap of the first shoulder strap assembly being oriented perpendicular to a sagittal plane of the supporting panel.

3. The ergonomic pet carrier for single-person use as claimed as claim 1 further comprises:
    a frame comprising a front strap, a rear strap, a first lateral strap, and a second lateral strap;
    the first lateral strap being fixed across the first lateral edge of the supporting panel;
    the second lateral strap being fixed across the second lateral edge of the supporting panel;
    the front strap being fixed in between the first lateral strap and the second lateral strap along a front edge of the supporting panel;
    the rear strap being positioned in between the first lateral strap and the second lateral strap along a rear edge of the supporting panel, wherein the front strap comprises one of the four supplementary straps and the rear strap comprises another of the four supplementary straps.

4. The ergonomic pet carrier for single-person use as claimed as claim 1 wherein:
    the supporting panel tapers between the first lateral edge and the second lateral edge.

5. The ergonomic pet carrier for single-person use as claimed as claim 1 comprises:
    the plurality of leg-receiving holes comprises a first foreleg hole, a second foreleg hole, a first hindleg hole, and a second hindleg hole.

6. The ergonomic pet carrier for single-person use as claimed as claim 5 further comprises:
    the first foreleg hole and the second foreleg hole being positioned at a first distance between a forward edge and a rearward edge of the supporting panel, wherein the first foreleg hole and the second foreleg hole are disposed on opposite sides of a sagittal plane of the supporting panel; and
    the first hindleg hole and the second hindleg hole being positioned at a second distance between the forward edge and the rearward edge of the supporting panel, wherein the first hindleg hole and the second hindleg hole are disposed on opposite sides of the sagittal plane of the supporting panel.

7. The ergonomic pet carrier for single-person use as claimed as claim 6 wherein:
    first and second of the four supplementary straps are positioned forward and rearward of the first foreleg hole and second foreleg hole along the length of the supporting panel between the forward edge and the rearward edge; and
    third and fourth of the four supplementary straps are positioned forward and rearward of the first hindleg hole and second hindleg hole along the length of the supporting panel between the forward edge and the rearward edge.

8. The ergonomic pet carrier for single-person use as claimed as claim 1 comprises:
    a first leg restraint;
    a second leg restraint;
    the first leg restraint and the second leg restraint being fixed to a first surface of the supporting panel.

9. The ergonomic pet carrier for single-person use as claimed as claim 1 comprises:
    a plurality of reinforcing frames; and each of the reinforcing frames being perimetrically positioned around a corresponding leg-receiving hole of the plurality of leg-receiving holes.

10. The ergonomic pet carrier for single-person use as claimed as claim 1 comprises:
a first fastener;
a second fastener;
the first fastener and the second fastener each comprise a first member and a second member;
the first fastener being connected with the first shoulder strap assembly;
the second fastener being connected with the second shoulder strap assembly;
the first member being connected to the free end of the first main strap;
the second member being connected to the free end of the second main strap; and
the first member being engaged with the second member.

11. The ergonomic pet carrier for single-person use as claimed as claim 1 comprises:
a first hand-loop strap;
the first hand-loop strap comprises a connecting strap and a looped strap;
the first hand-loop strap being connected to the first shoulder strap assembly;
the looped strap being connected to the second main strap with the connecting strap; and
the connecting strap being positioned along the second main strap, opposite the free end of the second main strap.

12. The ergonomic pet carrier for single-person use as claimed as claim 1 comprises:
a second hand-loop strap;
the second hand-loop strap comprises a connecting strap and a looped strap;
the second hand-loop strap being connected to the second shoulder strap assembly;
the looped strap being connected to the second main strap with the connecting strap; and the connecting strap being positioned along the second main strap, opposite the free end of the second main strap.

* * * * *